(12) United States Patent
Herden et al.

(10) Patent No.: US 9,393,941 B2
(45) Date of Patent: Jul. 19, 2016

(54) EMERGENCY BRAKE DEVICE FOR A RAIL VEHICLE, BRAKE SYSTEM FOR A RAIL VEHICLE, AND RAIL VEHICLE

(75) Inventors: Marc-Oliver Herden, Munich (DE); Matthaeus Englbrecht, Munich (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 221 days.

(21) Appl. No.: 14/238,047

(22) PCT Filed: Aug. 10, 2012

(86) PCT No.: PCT/EP2012/065668
§ 371 (c)(1),
(2), (4) Date: Apr. 22, 2014

(87) PCT Pub. No.: WO2013/024019
PCT Pub. Date: Feb. 21, 2013

(65) Prior Publication Data
US 2014/0217810 A1    Aug. 7, 2014

(30) Foreign Application Priority Data
Aug. 12, 2011    (DE) .......................... 10 2011 110 047

(51) Int. Cl.
*B60T 8/58*    (2006.01)
*B60T 8/18*    (2006.01)
(Continued)

(52) U.S. Cl.
CPC . *B60T 8/58* (2013.01); *B60T 7/124* (2013.01); *B60T 8/1705* (2013.01); *B60T 8/1893* (2013.01);
(Continued)

(58) Field of Classification Search
CPC ..... B60T 8/1893; B60T 7/124; B60T 13/664; B60T 17/228; B60T 8/1705; B60T 8/58; B60T 13/665; B60T 13/68; B61H 13/20
USPC ........................................ 303/132, 3, 15, 128
See application file for complete search history.

(56) References Cited

U.S. PATENT DOCUMENTS 4,163,587 A * 8/1979 Limozin ............... B60T 8/1893
303/22.6
5,551,765 A * 9/1996 Sich ....................... B60T 8/1705
303/20
(Continued)

FOREIGN PATENT DOCUMENTS

CN           1822973 A     8/2006
DE           19848994 A1   5/2000
(Continued)

OTHER PUBLICATIONS

Machine Translation in English for WO 2005/005216A1; Inventor: Straube; 4 pages; Retrieve Date Sep. 1, 2015.*
(Continued)

*Primary Examiner* — Thomas J Williams
*Assistant Examiner* — Mariano Sy
(74) *Attorney, Agent, or Firm* — Barnes & Thornburg LLP

(57) ABSTRACT

An emergency brake device for a rail vehicle, having an emergency brake control valve device which provides an emergency brake control pressure to a pneumatic brake device of the rail vehicle; and having an emergency brake adjustment device which is capable of adjusting the emergency brake control pressure, which is provided to the pneumatic brake device, as a function of at least a load value of the rail vehicle and a speed value of the rail vehicle. Also disclosed is a brake system for a rail vehicle and to a rail vehicle.

10 Claims, 6 Drawing Sheets

(51) Int. Cl.
  *B60T 7/12* (2006.01)
  *B60T 13/66* (2006.01)
  *B60T 17/22* (2006.01)
  *B60T 8/17* (2006.01)
  *B61H 13/20* (2006.01)
  *B60T 13/68* (2006.01)

(52) U.S. Cl.
  CPC ............. *B60T 13/662* (2013.01); *B60T 13/665* (2013.01); *B60T 17/228* (2013.01); *B61H 13/20* (2013.01); *B60T 13/68* (2013.01)

(56) References Cited

U.S. PATENT DOCUMENTS

| | | | |
|---|---|---|---|
| 6,669,308 | B1 | 12/2003 | Aurich et al. |
| 8,989,927 | B2 * | 3/2015 | Herden ................ B60T 8/1705 303/7 |
| 2007/0236077 | A1 | 10/2007 | Schweikert et al. |
| 2011/0089755 | A1 * | 4/2011 | Itano .................... B60T 8/1893 303/14 |
| 2012/0286563 | A1 | 11/2012 | Lichterfeld et al. |
| 2015/0130267 | A1 * | 5/2015 | Rasel .................... B60T 8/361 303/57 |

FOREIGN PATENT DOCUMENTS

| | | | |
|---|---|---|---|
| DE | 102008012700 | B3 * | 6/2009 |
| DE | 102009051019 | A1 * | 5/2011 |
| DE | 102010005091 | A1 | 7/2011 |
| EP | 0438678 | A1 | 7/1991 |
| WO | WO 2005005216 | A1 * | 1/2005 |

OTHER PUBLICATIONS

Machine Translation in English for DE 102008012700B3; Inventor: Englebrecht et al.; 5 paages; Retrieve Date Apr. 7, 2015.*
Machine Translation in English for DE 102009051019A1; Inventor Gremmel et al.; 9 pages; Retrieve Date Sep. 1, 2015.*
International Preliminary Report on Patentability and Written Opinion of the International Search Authority for International Patent Application No. PCT/EP2012/065668, dated Aug. 10, 2012.
English Translation of International Preliminary Report on Patentability and Written Opinion of the International Search Authority for International Patent Application No. PCT/EP2012/065668, dated Aug. 10, 2012.
Search Report for International Patent Application No. PCT/EP2012/065668; Jul. 5, 2013.
Chinese Office Action for Chinese Patent Application No. 201280039520.2, dated Aug. 3, 2015, along with English Translation.

* cited by examiner

EMERGENCY BRAKE DEVICE FOR A RAIL VEHICLE, BRAKE SYSTEM FOR A RAIL VEHICLE, AND RAIL VEHICLE

PRIORITY CLAIM

This patent application is a U.S. National Phase of International Patent Application No. PCT/EP2012/065668, filed 10 Aug. 2012, which claims priority to German Patent Application No. 10 2011 110 050.8, filed 12 Aug. 2011, the disclosures of which are incorporated herein by reference in their entirety.

FIELD

Disclosed embodiments relate to an emergency brake device for a rail vehicle comprising an emergency brake control valve device, to a brake system for a rail vehicle, and also to a corresponding rail vehicle.

BACKGROUND

Pneumatic brake devices which are controlled by electronic brake control devices are often used in modern rail vehicles. In order to ensure that emergency braking can be performed even in the event of electronics having failed, an additional pneumatic fallback level is generally provided. In particular, an emergency brake device is intended to ensure that a minimum emergency brake control pressure for operating brake actuators of the pneumatic brake system is available. However, in the event of emergency braking, there is an increased risk of braking being performed so intensely that the exerted braking force can no longer be absorbed by means of the frictional contact between wheel and rail. This can lead to locking of the wheels. Furthermore, emergency braking often leads to sudden stopping of the rail vehicle, as a result of which passengers, in particular those who are standing, can be put at risk.

Disclosed embodiments improve the braking behavior of a rail vehicle in the event of emergency braking.

SUMMARY

Within the scope of the disclosed embodiments, a rail vehicle can denote one or more carriages with or without their own drive and/or a traction vehicle in any desired combination. In particular, a rail vehicle can have rail cars. A pneumatic brake device can have components which can be pneumatically and electrically operated. It is conceivable for a pneumatic or electropneumatic brake device to have, in particular, valves which can be electrically actuated, such as solenoid valves, or pilot control valves which can be electrically actuated. A pneumatic brake device can have, in particular, one or more actuators or force generators which can be pneumatically operated, for example pneumatic cylinders. Actuators of this type can be designed to operate friction brake elements of one or more friction brake devices. A friction brake device can have, for example as friction elements, one or more brake disks and associated brake shoes with brake lining, which brake shoes can be brought into frictional contact with an associated brake disk by means of a brake caliper by an actuator. The friction brake device can also be in the form of a block brake device in which a block with a brake lining can be brought into frictional contact with a running surface of a wheel, which is to be braked, by an actuator.

BRIEF DESCRIPTION OF THE FIGURES

A rail vehicle comprising an emergency brake device as described in this document and/or a brake system as described in this document is also provided. In the drawings.

DETAILED DESCRIPTION OF THE DISCLOSED EMBODIMENTS

Figure 1:
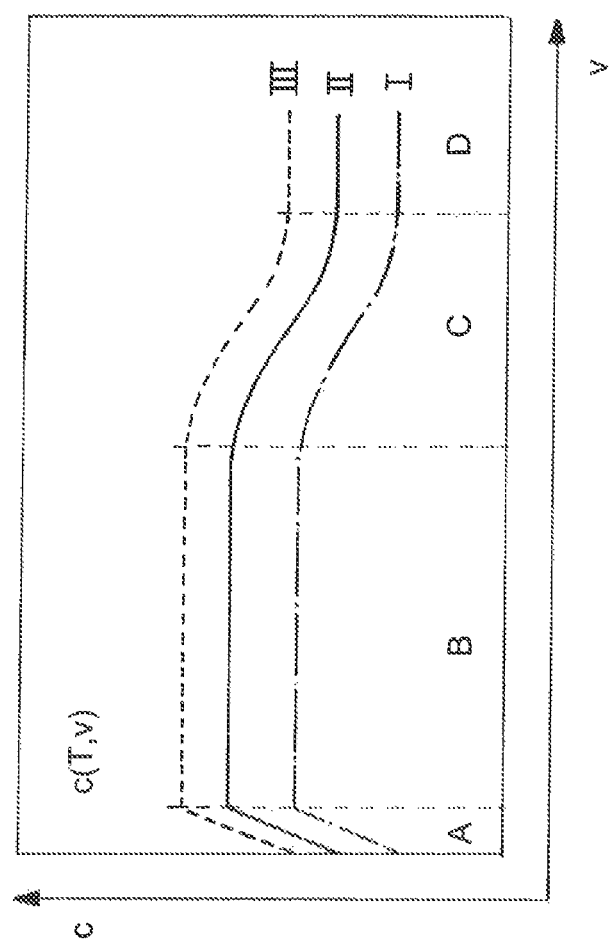
FIG. 1 shows examples of the profile of a brake pressure for a pneumatic brake device of a rail vehicle at different load values.

Disclosed embodiments provide an emergency brake device for a rail vehicle comprising an emergency brake control valve device which can provide an emergency brake control pressure to a pneumatic brake device of the rail vehicle. The emergency brake device also has an emergency brake pressure adjustment device which can adjust the emergency brake control pressure, which is provided to the pneumatic brake device, as a function of at least one load value of the rail vehicle and a speed value of the rail vehicle. Therefore, the wheels can be prevented from locking and smooth braking can be performed even during emergency braking. The emergency brake device can provide an emergency brake control pressure particularly in the event of emergency braking or rapid braking. The pneumatic brake device can be designed to convert the emergency brake control pressure into an emergency brake pressure which is active in the event of braking for operating brake actuators. An electropneumatic brake device of this kind can be, for example, a direct or indirect brake device. Provision can be made the emergency brake device to be able to provide a prescribed minimum emergency brake control pressure. The emergency brake device can be designed to provide a fallback level for an electropneumatic brake device. The emergency brake control pressure adjustment device can be formed separately from the emergency brake control valve device. It is also conceivable to form the emergency brake control pressure adjustment device jointly with the emergency brake control valve device, for example in the form of a common emergency brake module. In this case, the emergency brake control valve device and the emergency brake control pressure adjustment device can be arranged in a common housing or on a common housing. Provision can be made for the emergency brake control valve device to be in the form of a pneumatic or electropneumatic control valve device. The emergency brake control pressure can be a brake control pressure which is supplied to a power amplifier or pressure amplifier in order to be converted into an emergency brake pressure which is provided to brake actuators. The speed value can correspond, in particular, to the traveling speed of the rail vehicle. It is conceivable for the speed value to be determined on the basis of data from wheel rotation speed sensors or other suitable speed sensors, for example based on GPS signals, radar signals and/or optical signals. In particular, it is expedient when the speed value is a current speed value of the rail vehicle. The at least one load value of the rail vehicle can correspond, in particular, to a loading on one or more axles of the rail vehicle which are associated with the pneumatic brake device. The at least one load value can be determinable, for example, on the basis of a load pressure in one or more air bellows which are fitted close to axles. The emergency brake control pressure adjustment device can be connected downstream of the emergency brake control valve device, in order to adjust a pressure, which is provided by in the emergency brake control valve device, to the emergency brake control pressure. It is also conceivable for the emergency brake control pressure adjustment device to act directly on the emergency brake control valve device in order to adjust the emergency brake control pressure, so that the emergency brake control pressure which is provided to the pneumatic brake device corresponds to the brake control pressure which is provided by the emergency brake control valve device. The emergency brake device can be integrated in a brake system which can comprise, for example, a main control valve device for providing a brake control pressure and/or brake pressure. A main control valve device of this kind can be actuable by an electronic control device, for example by a brake computer. The main control valve device can be pneumatically actuable by the emergency brake control pressure in order to provide an emergency brake pressure. In this case, an emergency brake pressure can be adjustable by the main control valve device in accordance with the emergency brake control pressure. It is conceivable for the main control valve device to comprise a pressure converter which can convert a control pressure into a brake pressure. In particular, the main control valve device and the pressure converter can be arranged in or on a common housing.

Provision can be made for the emergency brake control pressure adjustment device to be able to adjust the emergency brake control pressure taking into account a change in the speed value over time. In particular, a continuous and/or steady and/or dynamic adjustment of the emergency brake control pressure can be performed as a function of a changing speed value and/or in response to changes in the speed value. Provision can be made for the adjustment of the emergency brake control pressure as a function of the speed value to follow the time profile of the speed value over a predetermined interval. The interval can be selected in such a way that it connects two speed ranges with different, substantially constant, brake pressures. A steady and/or gentle transition of the brake pressure between the speed ranges can be set by the emergency brake control pressure adjustment device during the interval. It is advantageous for the adjustment of the emergency brake control pressure as a function of the speed value which has changed over time to dynamically and/or continuously and/or directly follow the change in the speed value at least over a sub-range of the speed profile, for example during the interval.

Provision can be made for the emergency brake control pressure adjustment device to have a pressure rocker for adjusting the emergency brake control pressure. Suitable control pressures can be supplied to the pressure rocker in order to adjust an emergency brake control pressure, which is provided by the emergency brake control valve device, as a function of the load value and the speed value. Therefore, a desired emergency brake control pressure can be set in a simple manner.

In at least one disclosed embodiment, provision can be made for a load pressure, which corresponds to the at least one load value, to be supplied or to be able to be supplied to the emergency brake control pressure adjustment device in order to adjust the emergency brake control pressure. Load pressure can be supplied or be able to be supplied to a pressure rocker as control pressure. The emergency brake control pressure can be pneumatically adjusted in this way.

It is conceivable for a pressure value, which corresponds to the speed value, to be supplied or to be able to be supplied to the emergency brake control pressure adjustment device in order to adjust the emergency brake control pressure. To this end, an electropneumatic valve device, for example, can be provided, the electropneumatic valve device being able to convert an electrical signal, which corresponds to the speed value, into a corresponding pneumatic pressure which can be supplied to the emergency brake control pressure adjustment device. As an alternative, provision can be made for the emergency brake control pressure adjustment device to be designed to adjust the emergency brake control pressure in an electromagnetic manner. By way of example, a solenoid, for example a coil apparatus, can be provided, the solenoid being able to suitably influence the emergency brake control pressure adjustment device by virtue of supplying current based on the speed value, in order to achieve the desired adjustment. By way of example, a pressure compensator of the adjustment device can be correspondingly actuable by a solenoid of this kind in accordance with a speed value. A suitable control device can be provided for electromagnetic actuation.

Provision can also be made for the emergency brake device to have an electronic control device which can actuate the emergency brake control valve device. Actuation by an electronic control device can generally comprise the targeted supply of current and/or voltage to electropneumatic elements, such as one or more solenoid valves for example. Therefore, the emergency brake control valve device can be actuated in the desired manner and the emergency brake control valve device can be actuated in a reliable and simple manner.

In at least one disclosed embodiment, the electronic control device can be designed in such a way that it can actuate the emergency brake control valve device based on the speed value and the load value in order to provide an emergency brake control pressure. Therefore, the electronic control device can be in the form of an emergency brake control pressure adjustment device. In this case, the supply of pneumatic control pressures which correspond to the load value and/or to the speed value can be dispensed with. It is expedient for the emergency brake control valve device to be designed in such a way that it can provide an emergency brake control pressure even in the event of the electronic control device and/or a brake control device failing.

The electronic control device can expediently be connected or be able to be connected to an electronic brake control device. By virtue of a connection of this kind, data signals can be interchanged between the electronic control device of the emergency brake device and the separate electronic brake control device. In this case, the electronic control device of the emergency brake device and the electronic brake control device can be in the form of components which can be operated independently of one another and which, in particular, can be supplied with current independently of one another. In general, an electronic brake control device can be provided which can actuate the emergency brake control valve device and a main control valve device, wherein the latter is designed to provide a brake pressure and/or a brake control pressure during normal operation. According to one variant, the electronic brake control device is designed to perform a plausibility check for the adjustment of the emergency brake control pressure, which adjustment is provided by the electronic control device, in the event of operation or actuation of the emergency brake control valve device by the electronic control device of the emergency brake device. Provision can be made for the electronic brake control device to be able to prohibit actuation of the emergency brake control valve device by the electronic control device of the emergency brake device if the plausibility check has shown that actuation is not plausible.

A brake system for a rail vehicle comprising an emergency brake device as described in this document is also provided. The brake system can also have an electronic brake control device and/or an antiskid computer in addition to an electronic control device or emergency brake device. Antiskid computer, electronic control device of the emergency brake device and electronic brake control devices can be in the form of control devices which can be operated separately from one another and which, in particular, can be supplied with current independently of one another. Provision can be made for an antiskid computer, the electronic brake control device and the electronic control device of the emergency brake device to engage in the compressed-air supply of the pneumatic brake device at different levels. In particular, it is possible, for example, for the antiskid computer to be provided for actuating outlet valves which are in each case associated with a pneumatically operated actuator. An outlet valve of this kind can be used to reduce the pressure which is supplied to the associated actuator, for example, when there is a risk of a wheel being locked. In general, provision can be made for an emergency brake device to be integrated into a brake system. The emergency brake device can have a selector valve. The selector valve can have two inputs and one output. The selector valve can be designed to connect that one of its inputs to which the higher pressure is applied to its output. In this case, provision can be made for a control pressure which is provided by an emergency brake control valve device to be applied to the one input of the selector valve. A control pressure which is provided by a main control valve device or a control pressure which is provided by a further valve device can be applied to the other input. The further valve device can be a pressure-limiting valve device which provides a minimum emergency brake control pressure which must not be undershot in the event of emergency braking. In this case, the pressure-limiting valve device can limit a high pressure, which is present in a compressed-air reservoir, to the minimum emergency brake control pressure. The provided minimum emergency brake control pressure can be substantially constant. In particular, provision can be made for the minimum emergency brake control pressure to not be electronically controlled but rather to be provided in a purely pneumatic manner. It is conceivable for the emergency brake device to have an emergency brake valve device which can be actuable by a train driver. The emergency brake valve device can be designed to interrupt a connection between a pressure-limiting valve device and a selector valve in a first switching position when emergency braking is not intended to be carried out. In a second switching position of the emergency brake valve device, when emergency braking is intended to be carried out, provision can be made for the emergency brake valve device to open a pneumatic connection between one input of the selector valve and the pressure-limiting valve device. Therefore, a pressure from the pressure-limiting valve device can be applied to the selector valve in the second switching position. An emergency brake valve device can have a first input and a second input and also an output. Provision can be made for the emergency brake valve device to have a selector function and to be able to connect that one of its inputs to which the higher pressure is applied to the output. In this case, provision can be made for the output of the emergency brake valve device to be connected to an input of a selector valve. An input of the emergency brake valve device can be connected to a pressure-limiting valve device. A further input can be connected to a main control valve device.

Therefore, in each case the highest of the control pressures which are provided by a main control valve device and/or a pressure-limiting valve device and/or an emergency brake control valve device can be output as emergency brake control pressure by means of the selector valve in order to generate a corresponding emergency brake pressure.

FIG. 1 shows various profiles of emergency brake pressures c as a function of the load value T and the traveling speed v of a rail vehicle. Three curves I, II and III at different load values are shown. An emergency brake pressure depends in each case substantially linearly on an emergency brake control pressure, so that conclusions about the required control pressures can be directly drawn from the brake pressures.

In general, a greater amount of force for braking the vehicle can be absorbed by means of the wheel/rail contact at a higher load value since, in this case, the vehicle is pressed firmly onto the rail by its weight. In other words, the adhesion coefficient, which defines the amount of force which can be transmitted by the wheel onto the rail, is greater at a relatively high load value than at a relatively low load value. Therefore, a greater brake force and a greater brake pressure can be applied at a relatively high load, without the wheels becoming locked. Accordingly, curve I represents a low load value, curve II represents a medium load value, and curve III represents a high load value. In general, the loading of a rail vehicle or an axle of the rail vehicle does not change significantly during operation. Although dynamic effects can produce fluctuations in the load pressure signal, for example owing to vibrations in the air bellows which are generated in the event of acceleration or braking of the rail vehicle, the fluctuations do not have any effect on the loading of the vehicle on average. The actual load value substantially affects the position of each curve, in particular in respect of the starting value of the brake pressure at the maximum speed shown. In general, each curve can be divided into four regions A, B, C and D. In region D, which corresponds to high speeds, a constant emergency brake pressure is substantially provided. Region D is generally above 200 km/h. There is a lower adhesion coefficient at high speeds. Therefore, the brake pressure in the curve profile is accordingly extremely low. In region B, at considerably lower speeds and a correspondingly higher adhesion coefficient, a constant relatively high brake pressure is substantially likewise applied. At very low speeds, in region A, the brake pressure is generally reduced to the point at which the vehicle is stationary. The described emergency brake devices are able to actuate the region C which is shown in FIG. 1 and which is usually not present. Instead of positioning regions B and D next to one another in such a way that there is a jump in the brake pressure when a specific speed, which is usually approximately 200 km/h, is reached, the transition report C is provided. This provides a gentle curve profile which connects regions D and B to one another without there being a discontinuity or jump in the brake pressure curve profile. In this region, the emergency brake control pressure and therefore the associated brake pressure are adjusted as a direct function of a speed value of the rail vehicle. In this region, the set emergency brake control pressure, in particular, changes continuously as the speed changes, and therefore a steady curve profile is produced.

Figure 2:
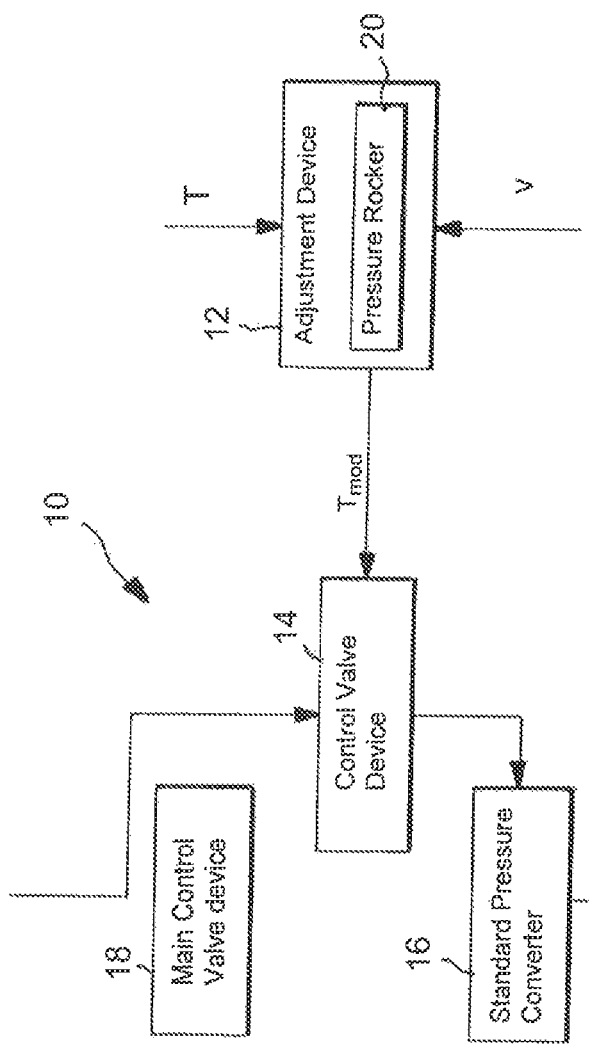
FIG. 2 schematically shows an emergency brake device.

FIG. 2 schematically shows an emergency brake device 10. The emergency brake device 10 has an emergency brake pressure adjustment device 12 and an emergency brake control valve device 14. The emergency brake control valve device 14 can be connected to a main air line (not shown). Furthermore, the emergency brake control valve device 14 is connected to a standard pressure converter 16 which can convert an applied control pressure, such as an emergency brake control pressure, into a brake pressure. FIG. 2 also shows a main control valve device 18 by means of which a control pressure CV can be provided during normal operation, for example in the event of normal service braking. The standard pressure converter 16 can convert the control pressure into a corresponding brake pressure. The main control valve device 18 can be actuable by an electronic brake control device (not shown). However, in this example, the emergency brake device is operated in the event of emergency braking, and therefore the main control valve device 18 may be bypassed. For reasons of clarity, connecting lines between the main control valve device 18 and the standard pressure converter 16 are not shown in this example. In one variant, the emergency brake control valve device 10 can be connected between the standard pressure converter 16 and the main control valve device 18. It should be noted that it is, of course, also possible to use, instead of a standard pressure converter, a pressure amplifier which not only transmits an applied control pressure to a greater volume, but also increases it.

In the disclosed embodiment which is shown in FIG. 2, the control valve device 14 of the emergency brake device is actuated by a pressure drop in the main air line, in order to initiate emergency braking. Accordingly, the control valve device 14 provides an emergency brake control pressure which is forwarded to the standard pressure converter 16. The brake control pressure is modified by a pneumatic load control pressure which is provided by the pressure adjustment device 12. To this end, a pneumatic load pressure signal Tmod is applied to the control valve device 14. The control valve device 14 uses suitable pneumatic components to adjust the control pressure, which is output by it, according to the modified load pressure signal Tmod. In this example, the pressure adjustment device 12 is designed in such a way that it can receive a pneumatic load pressure signal which specifies a load value of the rail vehicle or an associated axle. The signal can originate, for example, from an air bellows. A speed signal is also supplied to the pressure adjustment device 12. The signal may be an electrical or pneumatic signal. The pressure adjustment device 12 which is shown in this example is designed in such a way that it can apply a variable load pressure signal Tmod to the control valve device 14. The load pressure signal Tmod is adjusted as a function of the speed. The adjustment can be performed in a pneumatic or electropneumatic manner. In this example, provision is made for the pressure adjustment device 12 to have a pressure rocker 20 which can pneumatically generate a corresponding modified load pressure signal. Provision is made, at high speeds where experience has shown that the adhesion coefficient between wheel and rail is lower than at a lower speed, for the modified load pressure value Tmod to be set lower than at lower speeds. Therefore, the control valve device 14 is provided with a "virtual" load value signal which indicates a lower load value than can be expected at the actual load. Accordingly, a lower brake control pressure and therefore also a lower brake pressure are provided for braking. Provision can be made, in particular, for a modification of the load pressure signal Tmod of this kind to be performed within a predetermined speed range which connects two extreme values for the brake control pressure and/or regions with substantially constant brake pressures to one another, as shown by region C in FIG. 1. The emergency brake control valve device 14 and the emergency brake pressure adjustment device 12 together form an emergency brake device.

Figure 3:
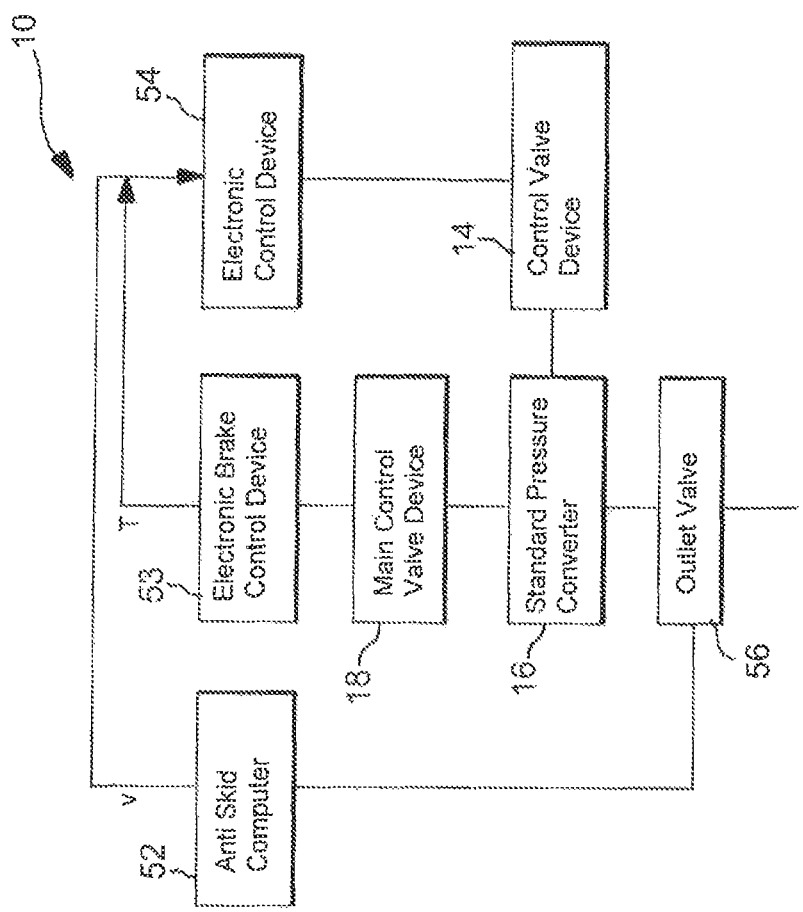
FIG. 3 schematically shows a further emergency brake device.

FIG. 3 shows a pneumatic brake device 10 for a rail vehicle comprising an emergency brake device. The brake device 10 has an electronic antiskid control device or an antiskid computer 52. An electronic brake control device 53 and also an electronic control device 54 of an emergency brake device are further provided. The antiskid computer 52 is connected to one or more outlet valves 56 in order to provide an antiskid function. To this end, the outlet valves are arranged in the compressed-air circuit downstream of a standard pressure converter 16 which provides the brake pressure for pneumatic actuators (not shown). The brake pressure which is applied to specific actuators can be reduced by the outlet valves 56 in accordance with instructions from the antiskid computer 52. Furthermore, a main control valve device 18, as in FIG. 2, is provided, it being possible for the main control valve device to provide a brake control pressure for the standard pressure converter 16. The main control valve device 18 can be actuated by the electronic brake control device 53 in order to provide a desired brake control pressure Cv. The electronic brake control device 53 can optionally be designed to actuate the outlet valves 56. To this end, the brake control device 53 can be directly or indirectly connected to the valves 56. An indirect connection can be established, for example, via the antiskid computer 52. The control device 54 is provided for actuating the control valve device 14 of the emergency brake device as a function of load and speed and can be considered to be part of the emergency brake device. Accordingly, in this case, the control valve device 14 is an electropneumatic device which can be electrically actuated by the electronic control device 54. The control valve device 14 of the emergency brake device is designed to provide an emergency brake control pressure in accordance with instructions from the control device 54. The emergency brake control pressure is adjusted by the control device 54 on the basis of load value data T and a speed value v. In this example, provision is made for one or more load signals comprising load value data to be supplied to the electronic brake control device 53, the brake control device 53 being designed to receive the signals. The electronic brake control device 53 transmits the data T, which is therefore available, to the control device 54 of the emergency brake device which is designed to receive the data. The control device 54 can be formed in one physical unit with the control valve device 14 of the emergency brake device. In this example, the pneumatic pressure adjustment device 12 of the emergency brake device which is shown in FIG. 2 and the task of which is taken over by the electronic control device 54, which therefore acts as a pressure adjustment device, is dispensed with here. The emergency brake device of FIG. 3 therefore comprises the electronic control device 54 and the control valve device 14. In order to fulfill its antiskid function, speed data relating to the rail vehicle, in particular in respect of the traveling speed, is available to the antiskid computer 52. To this end, the antiskid computer 52 can determine the vehicle speed, for example, from data from wheel speed sensors. In this example, speed data v is transmitted by the antiskid computer 52 to the electronic control device 54 of the emergency brake device 10 which can receive this information. Therefore, the electronic control device 54 of the emergency brake device 10 can use existing data v, T. It goes without saying that the electronic control device 54 can be connected to other sensors and/or control devices in a suitable manner in order to receive the load values T and traveling speed values v which are used for actuating the control valve device 14. In general, a control device 54 can be designed to actuate a predefined fallback emergency brake pressure in the event of speed data v and/or load value data T failing to be transmitted.

Figure 4:
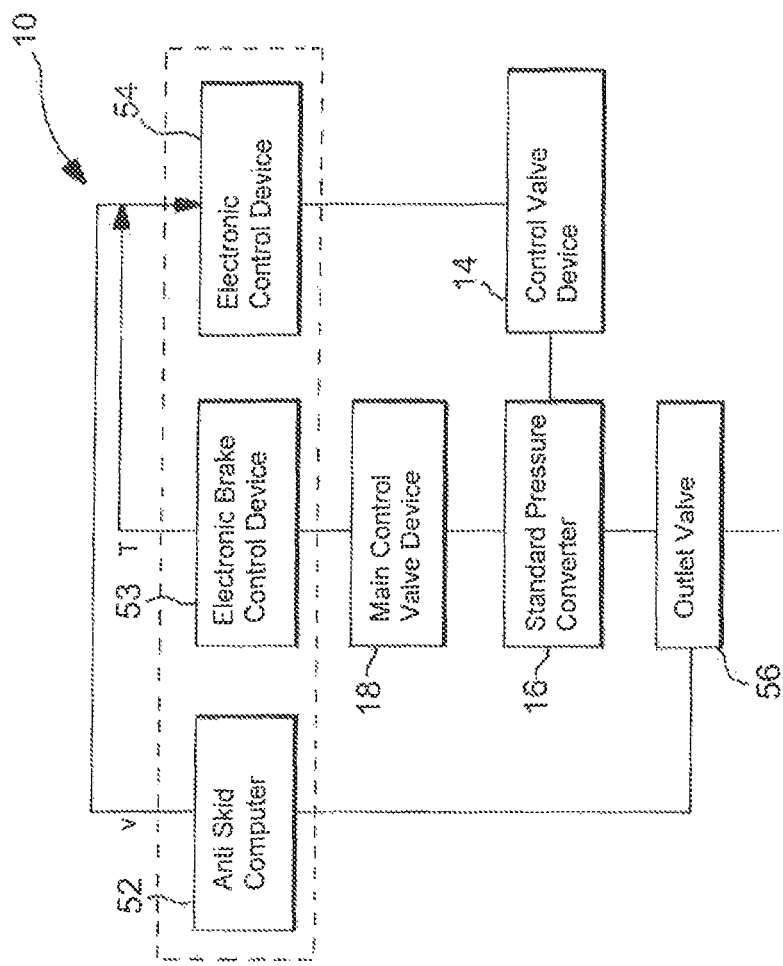
FIG. 4 shows a further emergency brake device.

FIG. 4 schematically shows a variant of the brake device 10 which is shown in FIG. 3. In this example, the control devices, specifically the antiskid computer 52, the electronic brake control device 53 and the control device 54 of the emergency brake device, are arranged in a common physical unit, for example a common housing or in housings which are fixedly connected to one another. The control devices are expediently functional separately from one another, in order to prevent simultaneous failure of a plurality of control devices.

Figure 5:
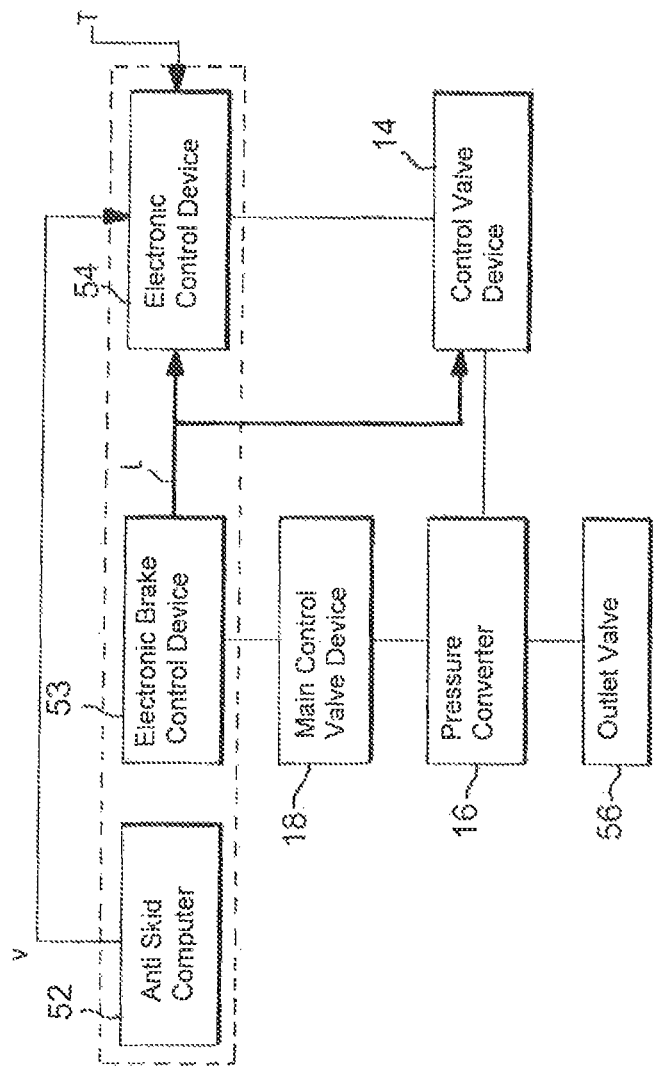
FIG. 5 schematically shows a further variant of an emergency brake device.

FIG. 5 shows a further variant of a brake device comprising an emergency brake device which has substantially the same components as the variant which is shown in FIG. 4. In the example of FIG. 5, a data transmission connection is provided between the electronic brake control device 53 and the control device 54 of the emergency brake device. Control commands and information about the vehicle state or braking state, for example, can be transmitted via this connection. Furthermore, a load value signal is supplied to the electronic control device 54 from the outside in this example, for example by a suitable load value sensor. In addition, load value data T can be transmitted by the brake control device 53, it being possible for the transmission to serve, for example, for plausibility checking and/or for providing a redundancy level. In the event of emergency braking, the electronic brake control device 53 can carry out a plausibility check of the emergency braking, which is provided by the control device 54, via the data transmission connection. In particular, the electronic brake control device 53 can be designed to receive and to process load value data, in order to thus generate an additional redundancy. By way of example, the brake control device 53 can be connected to a suitable load value sensor which delivers signals which are independent of signals which are supplied to the control device 54. If the electronic brake control device 53 determines that the emergency braking which is provided by the control device 54 is implausible, for example because it does not fulfill certain predefined plausibility criteria, the electronic brake control device 53 can prohibit or prevent actuation of the control valve device 14 by the control device 54. In this case, purely pneumatic emergency braking can be carried out, in the case of which the brake pressure may not be directly controlled as a function of the speed. Provision can be made for the electronic brake control device 53 to be designed and connected in order to actuate the control device 14 of the emergency brake device. Therefore, when the electronic brake control device 53 prohibits actuation of the control valve device 14 by the control device 54 of the emergency brake device 10, the electronic brake control device 53 can instead actuate the control valve device 14 itself. To this end, it may be expedient for the electronic brake control device 53 to likewise be designed to receive traveling speed data which can be provided to it, for example, by means of suitable sensors, a superordinate control device or by the antiskid computer 52. However, it is also feasible for the electronic brake control device 53 to actuate the control valve device 14 independently of the load value and/or independently of the speed, bypassing the electronic control device 54, in the event of emergency braking, in order to provide a fallback level with a defined emergency brake control pressure or emergency brake pressure. Pneumatic emergency braking can be carried out in the event of the brake control device 53 and the control device 54 failing.

Figure 6:
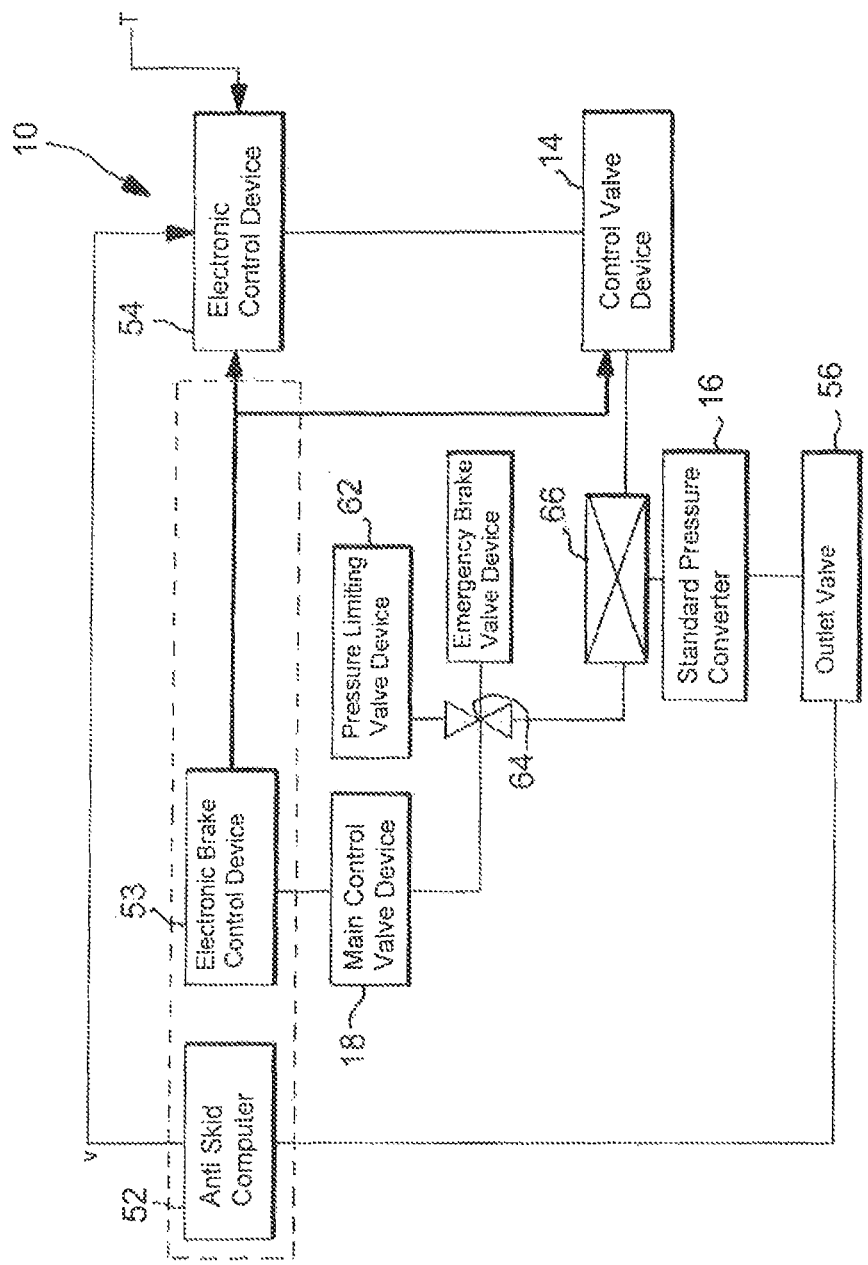
FIG. 6 schematically shows yet a further variant of an emergency brake device.

FIG. 6 schematically shows a further brake device 10. In comparison to the brake device which is shown in FIG. 5, this variant provides an additional pneumatically actuable fallback level. In the example, the antiskid computer 52 and the electronic brake control device 53 are combined in one physical unit. The control device 54 of the emergency brake device is a separate control device. A pressure-limiting valve device 62 which applies a minimum pressure Cmin, which is provided for emergency braking, to an emergency brake valve device 64 is provided. To this end, the pressure-limiting valve device 62 can be connected to a pressure reservoir, the pressure-limiting valve device being able to apply the storage pressure of the pressure reservoir, reduced to the minimum pressure, to the emergency brake valve device 64. The emergency brake valve device 64 can be actuated, for example, directly by a train driver. An input of the emergency brake valve device 64 is connected to the pressure-limiting valve device 62 or another input is connected to the main control valve device 18. An output of the emergency brake valve device 64 is connected to a selector valve 66 which can be, in this example, a double non-return valve. It is conceivable for the emergency brake valve device 64 to be in the form of a 3/2-way valve. In the event of normal operation, the emergency brake valve device 64 is switched in such a way that a connection of the output of the emergency brake valve device 64 to the pressure-limiting valve 62 is blocked. The selector valve 66 has two inputs and one output. The output of the selector valve 66 is connected to a standard pressure converter 16 or to a pressure converter which can convert a pressure, which is applied to the output of the selector valve 66, into a brake pressure. The selector valve 66 is designed in such a way that it connects the output to that one of its inputs to which the higher pressure is applied. In the event of normal operation, that is to say during service braking for example, the main control valve device 18 provides a brake control pressure, which is applied to the one input of the selector valve 66 by means of the emergency brake valve device 64, in accordance with instructions from the electronic brake control device 53. In this case, the connection between the selector valve device 66 and the pressure-limiting valve 62 is blocked by the emergency brake valve device 64. The output of the selector valve 66, which is connected to the output of the control valve device 14 of the emergency brake device, is not pressurized in this case since the control valve device 14 is not actuated in order to provide an emergency brake control pressure either by means of the control device 54 of the emergency brake device nor by means of the electronic brake control device 53. Therefore, normal service braking is performed in this case in accordance with the brake control pressure which is supplied to the standard pressure converter 20 by means of the selector valve 66. In the event of emergency braking, the emergency brake valve device 64 is switched to a passage position in which the pressure-limiting valve 62 is connected to the selector valve device 66. The electronic brake control device 53 can optionally actuate emergency braking by means of the main control valve device 18, and provide, for example, a brake control pressure Cv. Provision can be made for the emergency brake valve device 64 to have an additional selector valve function which forwards the higher of the pressures Cv and Cmin to the input of the selector valve 66. In this case, the higher of the two pressures from this branch of the brake device is present at the input of the selector valve 66. If, for example, the electronic brake control device 53 has failed, or emergency brake control is not provided by the brake control device 53, the pressure Cmin which is provided by the pressure-limiting valve 62 is applied to the selector valve 66. On the other side, as described with reference to FIG. 5, the control valve device 14 is actuated either by the control device 54 or by the electronic brake control device 53 in order to generate an emergency brake control pressure. The emergency brake control pressure is applied to the second input of the selector valve 66. The selector valve 66 is adjusted in such a way that the highest applied pressure is forwarded to the standard pressure converter 16. Therefore, in this variant, the highest applied control pressure is in each case active for braking. This leads, in particular, to there being up to three different control pressures which can be provided by means of the main control valve device 18, the pressure-limiting valve 62 and the control valve device 14 of the emergency brake device 10. The described variant ensures that the highest control pressure is active. If one or even two of the control pressure-providing systems should fail, a third pressure can still be provided. There are therefore two fallback levels for providing control pressures in the event of emergency braking in this example. In particular, it is ensured that a minimum emergency brake pressure is provided pneumatically by means of the pressure-limiting device 62 even in the event of the electronic control devices 52, 53 and 54 failing. The pressure-limiting valve device 62, the selector valve 66 and the emergency brake valve device 64 can be considered to be part of the emergency brake device.

The features of the invention disclosed in the above description, in the drawings and in the claims may be essential for implementing the invention both individually and in any desired combination.

LIST OF REFERENCE SYMBOLS

10 Brake device
12 Pressure adjustment device
14 Control valve device
16 Standard pressure converter
18 Main control valve device
20 Pressure Rocker
52 Antiskid computer
53 Electronic brake control device
54 Electronic control device
56 Outlet valve
62 Pressure-limiting valve device
64 Emergency brake valve device
66 Selector valve

The invention claimed is:

1. An emergency brake device for a rail vehicle, comprising:
    an emergency brake control valve device which provides an emergency brake control pressure to a pneumatic brake device of the rail vehicle; and
    an emergency brake adjustment device which adjusts the emergency brake control pressure, which is provided to the pneumatic brake device, as a function of at least one load value of the rail vehicle and a speed value of the rail vehicle,
    wherein the at least one load value of the rail vehicle is lower than an actual load of the rail vehicle when the speed value of the rail vehicle is within a predetermined range.

2. The emergency brake device of claim 1, wherein the emergency brake adjustment device adjusts the emergency brake control pressure taking into account a change in the speed value over time.

3. The emergency brake device of claim 1, wherein the emergency brake adjustment device has a pressure rocker for adjusting the emergency brake control pressure.

4. The emergency brake device of claim 1, wherein a load pressure which corresponds to the at least one load value is supplied or can be supplied to the emergency brake adjustment device to adjust the emergency brake control pressure.

5. The emergency brake device of claim 1, wherein a pressure which corresponds to the speed value is supplied or can be supplied to the emergency brake adjustment device to adjust the emergency brake control pressure.

6. The emergency brake device of claim 1, further comprising an electronic control device which can actuate the emergency brake control valve device.

7. The emergency brake device of claim 6, wherein the electronic control device actuates the amergency brake control valve device based on the speed value and/or the at least one load value to provide an emergency brake control pressure.

8. The emergency brake device of claim 6, wherein the electronic control device is connected or can be connected to an electronic brake control device.

9. A brake system for a rail vehicle comprising an emergency brake device as claimed in claim 1.

10. A rail vehicle comprising an emergency brake device as claimed in claim 1 and/or a brake system as claimed in claim 9.

* * * * *